United States Patent [19]

Rupert et al.

[11] 4,070,906
[45] Jan. 31, 1978

[54] MODIFIED ROOF STRAIN INDICATOR

[75] Inventors: Gerald B. Rupert; Lawson John Tyler, both of Rolla, Mo.

[73] Assignee: The United States of America as represented by the Secretary of the Interior, Washington, D.C.

[21] Appl. No.: 750,745

[22] Filed: Dec. 15, 1976

[51] Int. Cl.² .............................................. G01B 5/30
[52] U.S. Cl. .................................. 73/88 E; 33/125 B
[58] Field of Search ........ 73/88 E; 33/147 D, 148 D, 33/125 B, 1 H

[56] References Cited

U.S. PATENT DOCUMENTS

| 3,380,167 | 4/1968 | Abel, Jr. et al. | 33/125 B |
| 3,416,230 | 12/1968 | Oleson et al. | 33/125 B X |

OTHER PUBLICATIONS

U.S. Bureau of Mines Information Circular, 1C8630, 1974, pp. 92-96.

Primary Examiner—Charles A. Ruehl
Attorney, Agent, or Firm—Thomas Zack; Donald A. Gardiner

[57] ABSTRACT

A modified horizontal strain indicator. Two spaced cap assemblies joined by a tensioned music wire are mounted on different roof bolts within a mine. One of the assemblies is the anchor cap assembly and the other assembly of the pair is the measuring cap assembly. The anchor assembly consists of two tubular sections vertically mounted upon each other and adjustably rotatable with respect to each other. The lower section thereof has an adjustable wire tensioning device to hold one end of the wire. Similarly the measuring cap assembly has two tubular sections which are vertically mounted on each other and also adjustably rotatable with respect to each other. Its lower section has a plunger biasing mechanism to tension the wire. Both upper sections of the anchor and measuring assembly may use set screws to vertically mount the invention to a mine roof on their respective rock bolts. A removable gage can be used to read the wire's horizontal displacement when attached to the plunger biasing mechanism.

8 Claims, 5 Drawing Figures

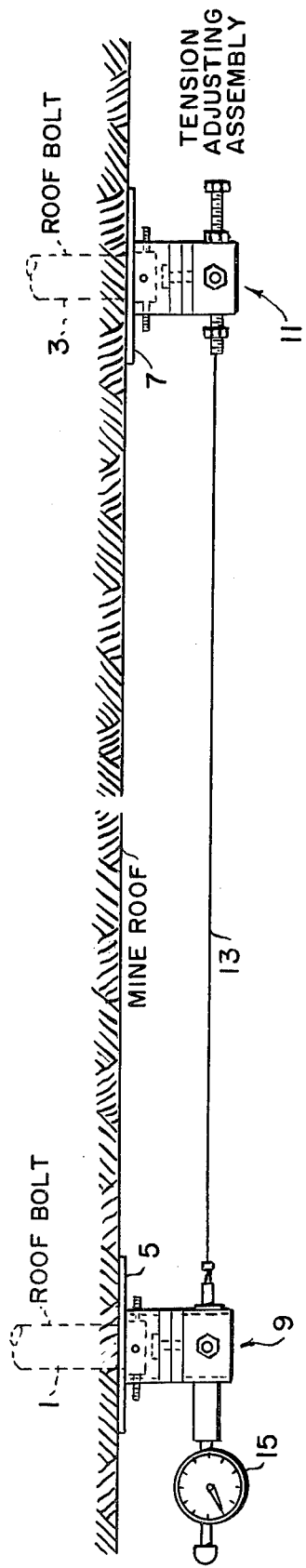
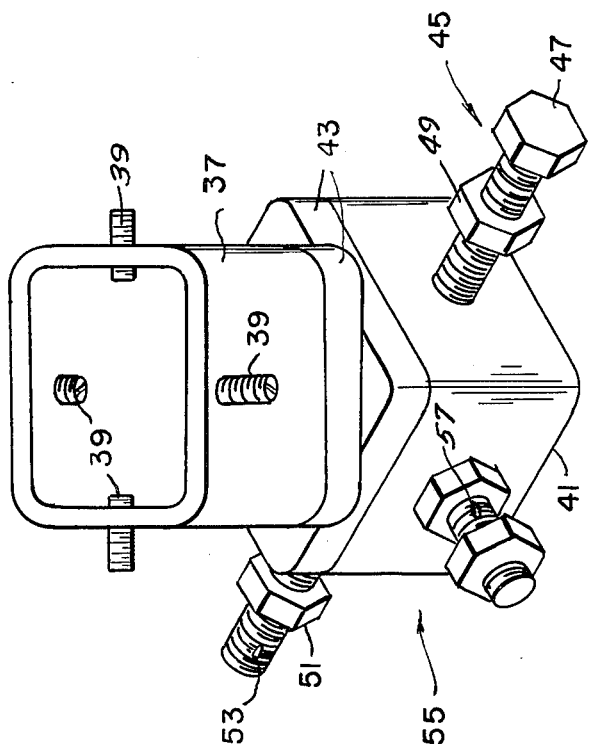
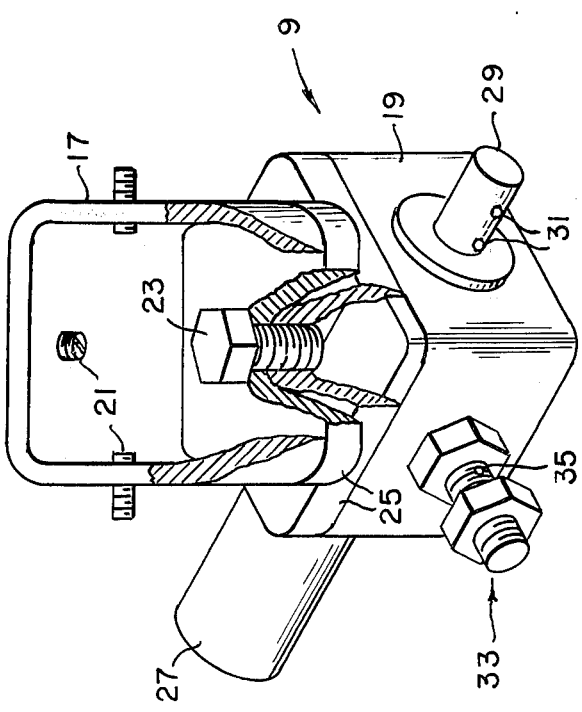

MODIFIED ROOF STRAIN INDICATOR

BACKGROUND OF THE INVENTION

1. Field of the Invention

Our invention is a horizontal roof strain indicator which employs tensioned wire between two separated roof bolts.

2. Description of the Prior Art

The basic invention over which our invention is an improvement is the horizontal roof strain indicator (HORSI). A full description of the HORSI can be found in the U.S. Bureau of Mines Information Circular/1974, IC 8630 on pages 92–96, and in the "Technology News" from the Bureau of Mines. Essentially this prior art discloses two spaced caps that form an assembly pair with a tensioned wire connected between them. One of the caps anchors the wire while the other measures the linear displacement on the wire with a removable dial indicator. Each cap is fixedly mounted on the lower end of an in situ mine roof bolt spaced from about 4 to 8 feet apart. Within the measuring cap a spring tensional plunger is linearly aligned with the wire at one end and, when it is attached, the dial indicator. As one or both of the firmly anchored rock bolts move vertically due to displacements of the mine roof, the reading on the horizontal stretched wire changes from its initial setting. These changes—which can indicate displacements as small as 0.001 of an inch—can be related to horizontal strain on the wire and an unstable mine roof condition transmitted from the roof bolts.

Our invention employs the same basic HORSI arrangement but, with rotatable caps that can be fixed at different angles. This rotational capability of the wire mounting caps assures that a straight pull will always be transmitted to the wire spring plunger regardless of the location of the roof bolts to which attached. It also allows installation of the HORSI without the necessity of the two faces of the caps being parallel when installed. In addition, the wire may be removed from one assembly end and reused with a different spaced similar assembly or it may be used in series with a plurality of assembly pairs. Thus, the prior art trial and error method of aligning the wire with the proper wire tension is eliminated and replaced with a quicker and more versatile invention.

The primary object of our invention is an improved horizontal roof strain indicator.

FIG. 1 illustrates how our invention would typically be used in situ on two mine roof bolts.

FIG. 2 depicts in a partially cutaway perspective view the measuring cap assembly of out preferred embodiment.

FIG. 3 in a perspective view shows the preferred embodiment of the anchor cap assembly.

Figure 4:
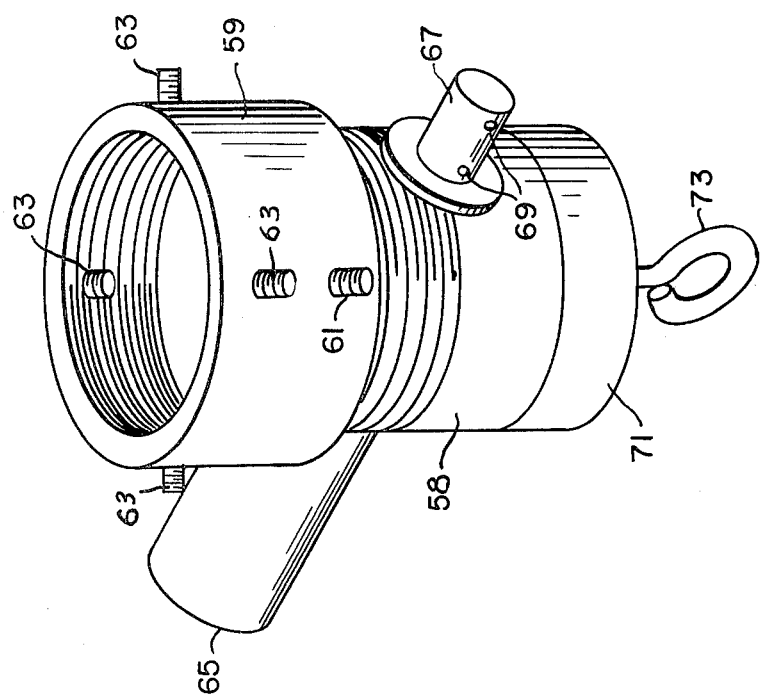

FIG. 4 is another embodiment of the FIG. 2 measuring cap assembly.

Figure 5:
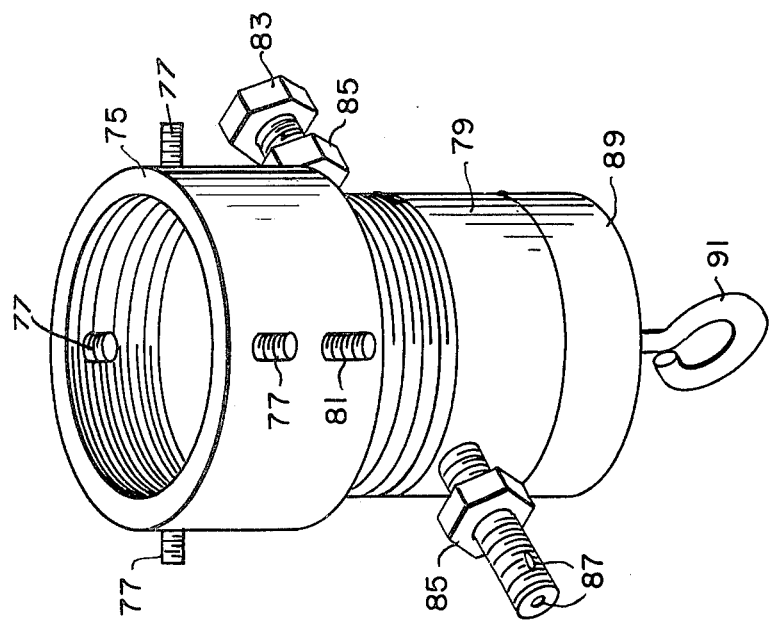

FIG. 5 illustrates the anchor cap assembly useable with the FIG. 4 embodiment.

In a typical mine set up, our invention would be rigidly attached to the lower ends of two spaced roof bolts as illustrated in FIG. 1. As is the normal case, the roof bolts 1 and 3 (shown in phantom lines) would be rigidly anchored at their upper ends into the overburden of the mine roof. Conventional roof bolt base plates 5 and 7 used in conjunction with their respective roof bolts to retain more of the adjacent overburden are also illustrated. Resin roof bolts now being widely used for roof support are particularly well suited for use with our invention as will become clearer from a reading of this specification. Our invention is made up of the measuring cap assembly 9, the anchor cap assembly 11, and the interconnecting piano or music wire 13. A removable dial gage 15 can be mounted to the left of the measuring cap assembly to measure the relative displacement of the wire 13. The wire is a music or piano wire capable of withstanding tensions of several hundred thousands psi.

The measuring cap assembly has two tubular sections that are rectangular or square in cross-section. Each is vertically aligned with the other and horizontally rotatable with respect to the other. As depicted in FIGS. 2 and 3, the preferred embodiment would construct these tubular sections in a hollow square cross-sectional configuration when viewed in a horizontal plane from above. The upper tubular section 17 is rotatably mounted over the lower section 19. Four mounting set screws 21—only three of which are shown—allow the upper section to be rigidly attached to the lower depending exposed end of the roof bolt 1 embedded within the mine roof. The locking bolt 23—which can be seen in the cut away portion of section 17—joins the two sections together. When this bolt is loosened, the lower section 19 may be rotated with respect to the upper fixed section. Upon achieving the desired rotated angular relationship with the piano wire 13 straightly aligned between the two assemblies, the bolt 23 can then be tightened. Actually the bolt is threaded into a hole which extends through two steel planar plates 25 that face each other and can slide over each other. One of these steel plates is fixed to the bottom of the upper section and the other opposing plate is fixed on the top of the lower tubular section. The lower rectangular tubular section has a horizontal through hole which allows a plunger housing 27 with its spring tensioned plunger 29 to be inserted. Wire retaining holes 31 provide for the rigid attachment of the wire so that it moves in a straight line in unison with the plunger. When the observer desires to take readings with the movable dial gage 15, a protruding slideable end portion is inserted within the plunger housing 27 so that it slides with the spring tensioned plunger. Should it be desired to join several of the HORSI's in series or to form a roof matrix with them, a side mounting assembly 33 can also be used to attach an additional wire through its hole 35.

The anchor cap assembly (see FIG. 3) may have exactly the same upper tubular section 37 as the FIG. 1 measuring cap. Set screws 39 provide for the rigid attachment of this anchor cap to the roof bolt 3. Below this upper section is a lower section 41 which has a locking bolt (not shown) like bolt 27 to join it to the upper section and allow it to be rotated and then fixed at a desired angular relationship. Joining the two tubular sections are two steel plates 43 through which the holes for the lock bolt are located. Within the lower tubular pipe section 41 is the tension adjusting assembly 45 for the wire 13. It is made up of the straight threaded horizontally disposed adjusting bolt 47 extending through the section and out both sides, two lock nuts 49 and 51 on the bolt 47 on opposite sides of the section, and a slanted hole 53 at one end to receive the wire 13. An assembly 55 with its wire receiving hole 57 may also be attached to the side of the lower section 41 if it is desired to mount several HORSIs in series fashion to form what may be called a matrix pattern.

The readings taken on the removable gage are in distance—usually inches. What they tell an observer is the relative horizontal displacement of the wire resulting from the vertical displacement of the two roof bolts. In other words, it is relative displacement distances from initial settings which we are measuring whether they be positive or negative. For example, assuming an initial reading has been made and then there has been a roof sagging of the roof bolts, then a further reading would be different indicating an unstable condition in the mine roof overburden. The greater the difference or change in wire length the greater would be the potential danger.

The rotational capability of our modified HORSI allows the wire to be disconnected from one end and then sequentially attached to one or more adjacent roof bolts having the necessary complementary pair assemblies. Normally, the measuring cap assembly would remain on the same roof bolt and its anchor assembly end disconnected. Then on a different roof bolt, with its own anchor assembly the wire would again be connected to form what may be termed a new measuring-anchor pair assembly.

To install the measuring and anchoring cap assemblies of FIGS. 1 and 2 on existing roof bolts, the two locking bolts joining the two sections are loosened slightly to permit rotation of the sections by hand. Next, the set screws on the upper sections are tightened. After the wire joining the two assemblies is aligned so that it is tensioned and straight without links and in alignment with the plunger housing tensioned plunger, and tension adjustment bolt 47, each angular section reading is first noted and then the caps are removed from the roof bolts. Lastly, the lock bolts are tightened at the noted angular reading and then carefully reinstalled on the roof bolts by the set screws as before.

FIGS. 4 and 5 show a threaded circular pipe modified embodiment of our improved HORSI invention. The perspective or isometric view of FIG. 4 is the measuring cap assembly while the FIG. 5 isometric view is the anchor cap assembly. The externally threaded lower pipe section 58 has its upper section 59 held to it by internal threads. A locking set screw 61 within the wall of the upper cap can be tightened to lock the two units together once the wire has been properly aligned. Four mounting set screws 63 can be used to rigidly fix the assembly on the bottom of a roof bolt. There is, as in the FIG. 2 embodiment, a plunger housing 65 and a spring tension plunger 67 which extend through the hollow lower cap section. Holes 69 function to retain the tensioned wire. On the bottom of section 58 is a circular steel base plate 71 with a depending lower eyebolt 73 which is threadedly attached to the plate. An additional wire may be attached to the eyebolt from the mine floor to provide for convergence measurements. The FIG. 5 anchor cap assembly has the same cap configurations as the FIG. 4 cap assembly. Its internally threaded upper section 75 is ringed by four mounting set screws 77 to attach it to a roof bolt end. The lower section 79 is partially threaded externally so that it meshes with upper cap section. Lock set screw 81 allows both sections to be fixed with respect to each other when the wire is properly aligned. The tension adjusting bolt 83 is provided with two lock nuts 85 in threaded engagement therewith. At the end which retains the wire is a slanted hole 87. At the bottom of the lower section is the circular base plate 89 and the convergence measuring eyebolt 91 threadedly joined thereto. Except for the case where convergence measurements are made, the FIGS. 4 and 5 set up would in situ in a mine be similar to the FIG. 1 arrangement.

Although the preferred embodiment of FIGS. 2 and 3 employing cap assemblies that are square or rectangular in cross-section is believed superior to the threaded circular cross-section cap assemblies of FIGS. 4 and 5, either may be used. It is also possible to provide for rotational capability for only the measuring or the anchor assembly, however, providing this capability for both is preferred. Should only one assembly be rotatable, it would preferably be the measuring cap assembly. When resin roof bolts are employed our invention has an immediate advantage over the conventional HORSI in that it does not require hand torquing of the bolts to align the bolt head faces which may be impossible or at least impractical with presently used HORSIs on resin roof bolts. Whatever the configuration of the cap or its locking device, or any other disclosed feature none is to be used to limit the scope and extent of our invention which is to be measured only by the claims that follow.

We claim:

1. A horizontal roof strain indicator for use with two spaced mine roof bolts comprising:
   a measuring cap assembly having an upper and lower section, means for vertically mounting said sections to each other so that the lower section can be rotatably adjusted in a horizontal plane, said upper section having roof bolt attachment means and said lower section having wire biasing and retaining means;
   an anchor cap assembly spaced from said measuring cap assembly, said anchor cap assembly having roof bolt attachment means and means for retaining and adjustably tensioning a wire; and
   a tensioned wire extending from said wire biasing and retaining means to said means for retaining and adjustably tensioning.

2. The indicator of claim 1 wherein said anchor cap assembly comprises an upper and lower section joined together in a rotatably adjustable manner, said lower section including said means for retaining and adjustably tensioning.

3. The indicator of claim 2 also including means for attaching an additional wire to the side of each of said lower sections.

4. The indicator of claim 1 wherein said means for vertically mounting comprises a locking bolt extending between said upper and lower measuring cap sectins and said wire biasing and retaining means is a spring tensioned plunger assembly extending through said lower section.

5. The indicator of claim 1 wherein said means for vertically mounting comprises a threaded connection between said upper and lower measuring cap sections with a lockable member extending from one section to the threads of the other section.

6. The indicator of claim 5 wherein said anchor cap assembly comprises an upper and lower section threadedly joined to each other with a rotatable lock member extending from one section to the other section.

7. The indicator of claim 6 also including means for attaching an additional wire to each of said lower sections to provide for convergence measurements between the mine roof and floor.

8. The indicator of claim 1 also including a removable dial gage for use with the measuring cap assembly to measure linear displacements of the wire, said gage being operatively associated with the wire biasing and retaining means.

* * * * *